US012688428B2

(12) United States Patent
Ittycheriah et al.

(10) Patent No.: US 12,688,428 B2
(45) Date of Patent: Jul. 21, 2026

(54) USER-SPECIFIC TEXT RECORD-BASED FORMAT PREDICTION

(71) Applicant: Google LLC, Mountain View, CA (US)

(72) Inventors: Abraham Ittycheriah, Brookfield, CT (US); Adam Tishok, Mountain View, CA (US); Max Kessler, Mountain View, CA (US); Peter Likarish, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 385 days.

(21) Appl. No.: 18/137,115

(22) Filed: Apr. 20, 2023

(65) Prior Publication Data

US 2023/0259781 A1 Aug. 17, 2023

Related U.S. Application Data

(63) Continuation of application No. 17/258,418, filed as application No. PCT/US2018/041148 on Jul. 6, 2018, now Pat. No. 11,663,482.

(51) Int. Cl.
| | |
|---|---|
| *G06N 3/084* | (2023.01) |
| *G06F 40/103* | (2020.01) |
| *G06F 40/169* | (2020.01) |
| *G06F 40/258* | (2020.01) |
| *G06N 20/00* | (2019.01) |
| *G06V 10/46* | (2022.01) |
| *G06V 30/413* | (2022.01) |

(52) U.S. Cl.
CPC ........... *G06N 3/084* (2013.01); *G06F 40/103* (2020.01); *G06F 40/169* (2020.01); *G06F*

*40/258* (2020.01); *G06N 20/00* (2019.01); *G06V 10/464* (2022.01); *G06V 30/413* (2022.01)

(58) Field of Classification Search
CPC .... G06F 40/103; G06F 40/258; G06F 40/169; G06N 20/00
See application file for complete search history.

(56) References Cited

U.S. PATENT DOCUMENTS

| | | | |
|---|---|---|---|
| 7,370,274 B1 * | 5/2008 | Stuple | G06F 40/117 |
| | | | 715/255 |
| 7,640,505 B1 | 12/2009 | Edmunds | |
| 7,643,732 B2 | 1/2010 | Seo | |
| 7,751,688 B2 | 7/2010 | Seo | |
| 8,261,188 B2 | 9/2012 | Weiss | |
| 8,381,099 B2 | 2/2013 | Giannetti | |

(Continued)

OTHER PUBLICATIONS

International Search Report and Written Opinion mailed on Apr. 8, 2019, on application No. PCT/US2018/041148.

*Primary Examiner* — Mohammed H Zuberi
(74) *Attorney, Agent, or Firm* — Lowenstein Sandler LLP

(57) ABSTRACT

A method for training a machine learning model included generating training data for the machine learning model. Generating the training data includes generating first training input that includes candidate text portions of one or more electronic documents and generating a first target output for the first training input. The first target output identifies a formatting type for each of the candidate text portions. The training data is provided to train the machine learning model on (i) a set of training inputs including the first training input, and (ii) a set of target outputs including the first target output.

20 Claims, 6 Drawing Sheets

(56)  References Cited

U.S. PATENT DOCUMENTS

| | | | |
|---|---|---|---|
| 8,484,553 B2 | 7/2013 | Lloyd | |
| 9,286,271 B2 | 3/2016 | Khosrowshahi | |
| 9,372,858 B1 * | 6/2016 | Vagell | G06F 40/166 |
| 9,384,285 B1 | 7/2016 | Ding | |
| 9,411,781 B2 | 8/2016 | Prasad | |
| 9,461,945 B2 | 10/2016 | Phillips | |
| 9,514,113 B1 | 12/2016 | Shaw | |
| 9,519,622 B2 | 12/2016 | Sun | |
| 9,529,791 B1 | 12/2016 | Zheng | |
| 9,529,916 B1 | 12/2016 | Barguno | |
| 9,542,374 B1 | 1/2017 | Barr | |
| 9,594,542 B2 | 3/2017 | Gabel et al. | |
| 9,633,317 B2 | 4/2017 | Gabel | |
| 9,703,763 B1 | 7/2017 | Zemach | |
| 9,842,113 B1 | 12/2017 | Sorvillo | |
| 9,881,010 B1 | 1/2018 | Gubin | |
| 9,946,690 B2 | 4/2018 | Sesum | |
| 10,025,979 B2 | 7/2018 | Lazarevic | |
| 10,083,009 B2 | 9/2018 | Gabel | |
| 10,176,166 B2 | 1/2019 | Byron | |
| 10,210,455 B2 | 2/2019 | Ho | |
| 10,216,839 B2 | 2/2019 | Ho | |
| 10,346,154 B2 | 7/2019 | Agnew | |
| 10,387,143 B2 | 8/2019 | Dufresne | |
| 10,474,961 B2 | 11/2019 | Brigham | |
| 10,496,754 B1 | 12/2019 | Ferrucci | |
| 10,540,347 B2 | 1/2020 | Kunc | |
| 10,558,554 B2 * | 2/2020 | Bhandarkar | G06F 11/3072 |
| 10,628,525 B2 | 4/2020 | Fink | |
| 10,685,052 B2 | 6/2020 | Winther | |
| 10,803,100 B2 | 10/2020 | Ackermann | |
| 10,810,897 B2 | 10/2020 | Dechu | |
| 10,885,270 B2 | 1/2021 | Freed | |
| 10,891,699 B2 | 1/2021 | Admon | |
| 10,949,607 B2 | 3/2021 | Eifert | |
| 10,977,292 B2 | 4/2021 | Eifert | |
| 11,049,050 B2 | 6/2021 | Bastide | |
| 11,061,913 B2 | 7/2021 | Eifert | |
| 11,068,490 B2 | 7/2021 | Eifert | |
| 11,074,262 B2 | 7/2021 | Eifert | |
| 11,115,695 B2 * | 9/2021 | Lewis | H04L 67/10 |
| 11,157,260 B2 | 10/2021 | Dufresne | |
| 11,893,048 B1 * | 2/2024 | Penfield | G06V 30/412 |
| 2013/0117268 A1 | 5/2013 | Smith | |
| 2014/0358825 A1 * | 12/2014 | Phillipps | G06N 20/20 706/11 |
| 2014/0358828 A1 * | 12/2014 | Phillipps | G06N 20/00 706/12 |
| 2014/0372346 A1 * | 12/2014 | Phillipps | G06N 20/00 706/12 |
| 2015/0088888 A1 | 3/2015 | Brennan | |
| 2015/0113390 A1 * | 4/2015 | Vagell | G06F 40/106 715/255 |
| 2015/0142457 A1 * | 5/2015 | Marshall | G16H 50/50 705/2 |
| 2016/0103559 A1 * | 4/2016 | Maheshwari | G06F 3/0481 715/738 |
| 2018/0039907 A1 | 2/2018 | Kraley | |
| 2018/0150446 A1 | 5/2018 | Sivaji | |
| 2018/0204065 A1 * | 7/2018 | Pavetic | G06V 10/764 |
| 2018/0247156 A1 * | 8/2018 | Holtham | G06F 18/22 |
| 2018/0357562 A1 * | 12/2018 | Hofman | G06N 20/00 |
| 2019/0392363 A1 * | 12/2019 | Kohli | G06Q 50/04 |
| 2024/0111396 A1 * | 4/2024 | Vandivere | G06F 40/30 |
| 2025/0103874 A1 * | 3/2025 | Kurdelski | G06F 40/117 |

* cited by examiner

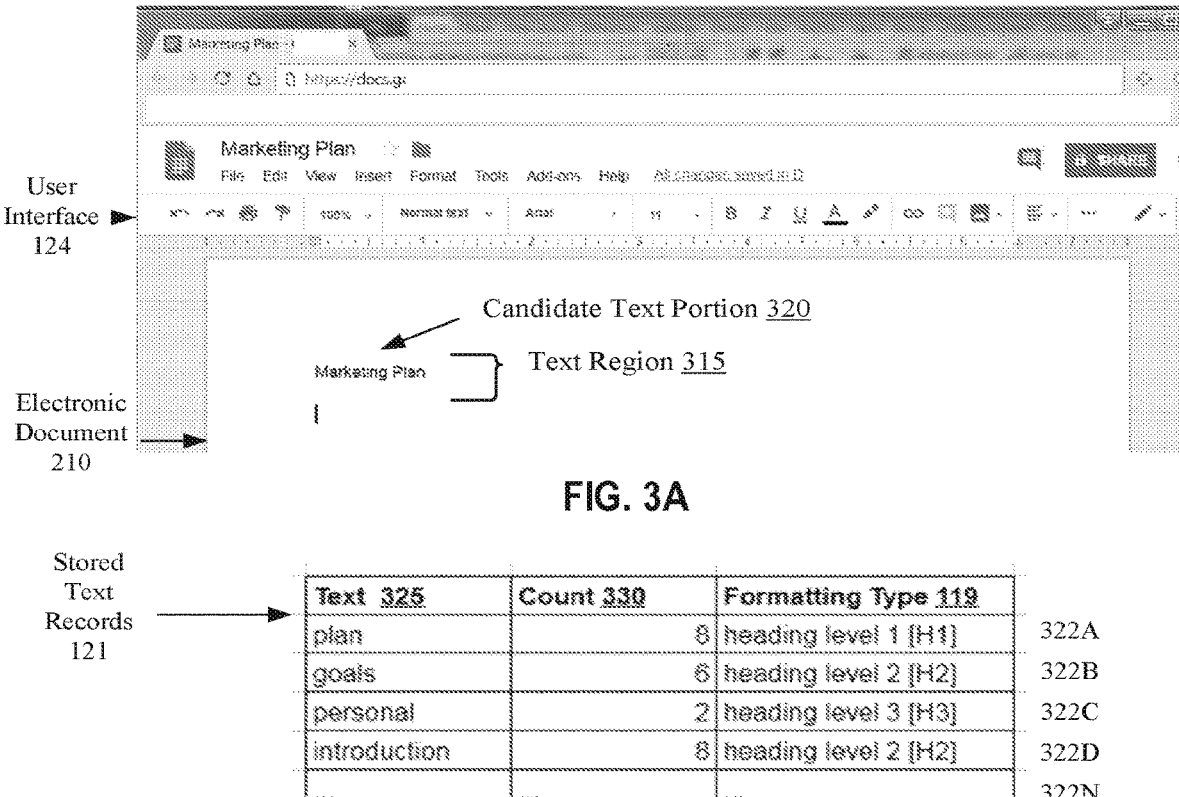
FIG. 3A
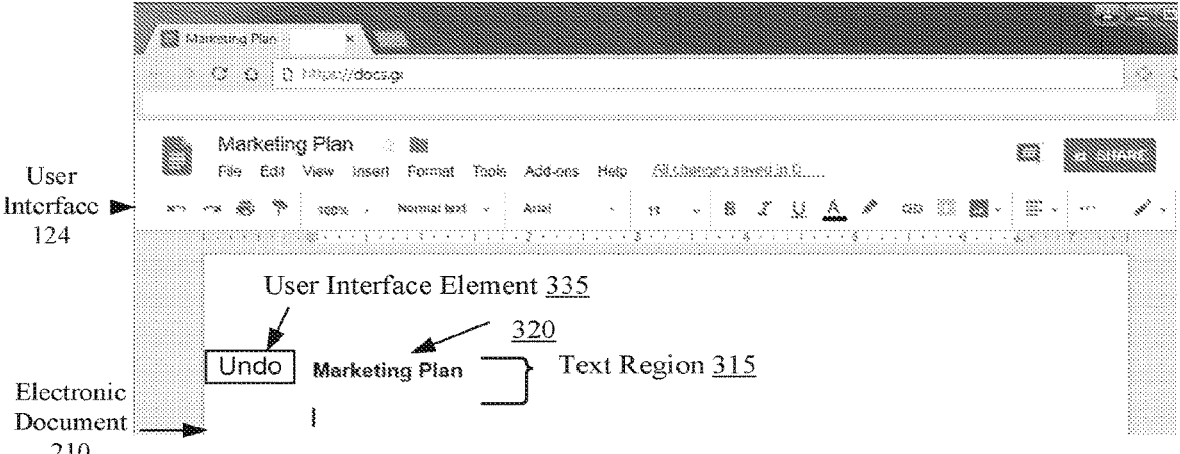
FIG. 3B
FIG. 3C

400

USER-SPECIFIC TEXT RECORD-BASED FORMAT PREDICTION

RELATED APPLICATION

This application is a continuation of U.S. patent application Ser. No. 17/258,418, filed Jan. 6, 2021, which is a U.S. National Stage Entry of PCT Patent Application No. PCT/US18/41148, filed Jul. 6, 2018, the entire contents of both are hereby incorporated by reference.

TECHNICAL FIELD

Aspects and implementations of the present disclosure relate to electronic documents, and more specifically, to providing a formatting suggestion for an electronic document.

BACKGROUND

Electronic document processing applications (e.g., a word processing application, a spreadsheet application, a presentation application) can be used to manipulate (e.g., create, edit, view, print, etc.) electronic documents. When editing an electronic document, a user enters text and at certain points in the editing process changes the formatting of at least some of the text of the electronic document.

SUMMARY

Aspects and implementations of the disclosure notify a user of an electronic document of a formatting suggestion. A text region in an electronic document is identified. A candidate text portion in the text region is determined based on a comparison of the text region with a plurality of predetermined patterns. One or more stored text records that correspond to the candidate text portion are identified. The stored text records include additional text regions that previously had been determined to have satisfied at least one of the predetermined patterns. The formatting type that is appropriate for the candidate text portion is confirmed based on individual word matches between the candidate text portion and the stored text record. Responsive to confirming that the formatting type is appropriate for the candidate text portion, a user of the electronic document is notified of the formatting suggestion according to the formatting type.

An aspect of the disclosure provides a method comprising: identifying, by a processing device, a text region in an electronic document; determining, by the processing device, that the text region comprises a candidate text portion that is a candidate for applying a formatting suggestion in accordance with a formatting type of a plurality of formatting types, wherein the determining is based on a comparison of the text region with a plurality of predetermined patterns; identifying, by the processing device, among a plurality of stored text records, a stored text record that corresponds to the candidate text portion, wherein the plurality of stored text records comprises additional text regions that previously had been determined to have satisfied at least one of the plurality of predetermined patterns; confirming, by the processing device, whether the formatting type is appropriate for the candidate text portion based on individual word matches between the candidate text portion and the stored text record; and responsive to confirming that the formatting type is appropriate for the candidate text portion, and providing, by the processing device, a notification to a user of the electronic document of the formatting suggestion according to the formatting type.

A further aspect of the disclosure provides a system comprising: a memory; and a processing device, coupled to the memory, the processing device to perform a method according to any aspect or implementation described herein. A further aspect of the disclosure provides a computer-readable medium comprising instruction that, responsive to execution by a processing device, cause the processing device to perform operations comprising a method according to any aspect or implementation described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3A illustrates an electronic document for which operations to determine that the text region includes a candidate text portion are performed, in accordance with implementations of the disclosure.

FIG. 3B illustrates stored text records used in operations with respect to format suggestion module, in accordance with implementations of the disclosure.

FIG. 3C illustrates an electronic document for which operations to notify a user of formatting suggestion are performed, in accordance with implementations of the disclosure.

DETAILED DESCRIPTION

Figure 1:
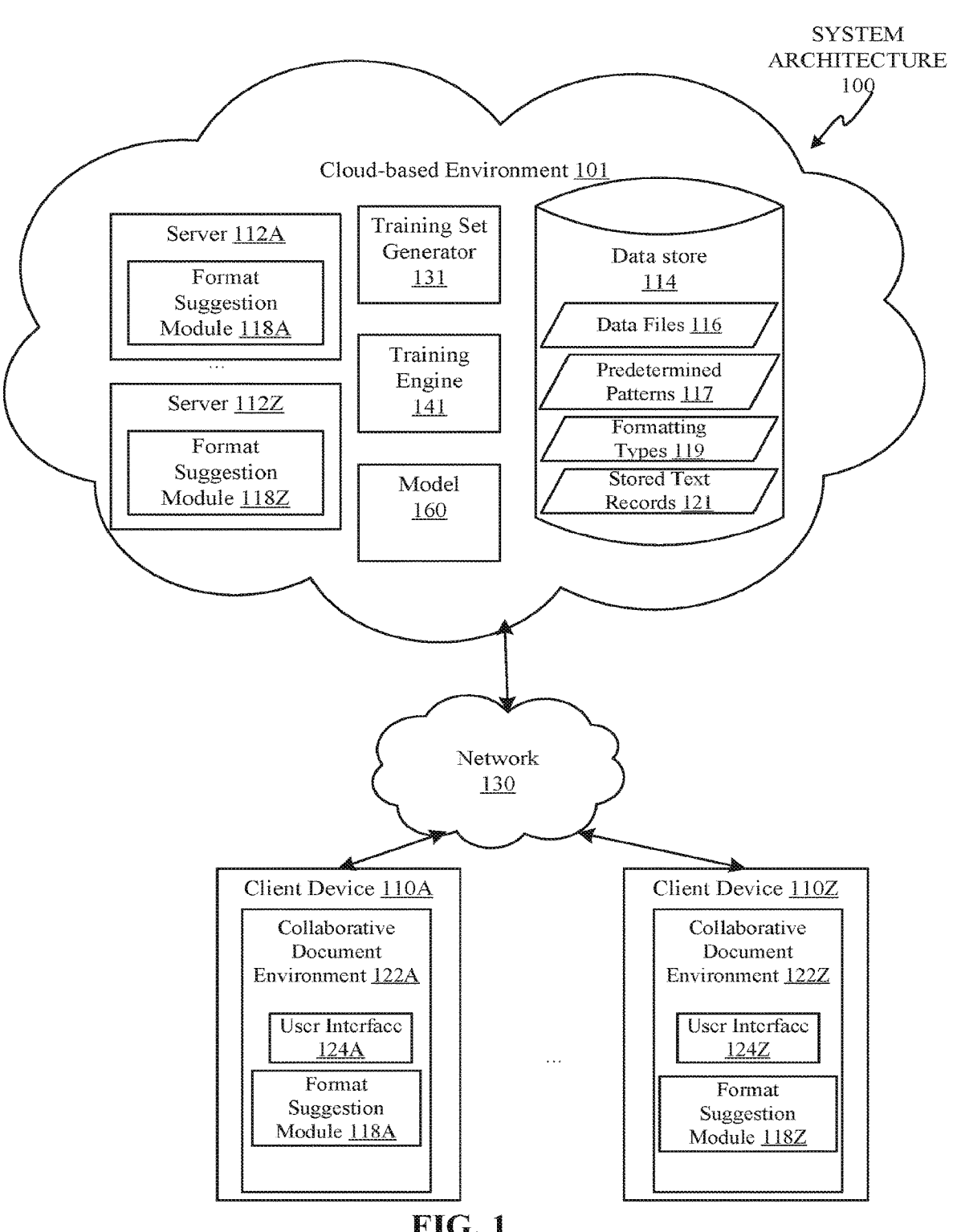
FIG. 1 illustrates an example of a system architecture, in accordance with implementations of the disclosure.

An electronic document may refer to media content used in electronic form. Media content may include text, tables, videos, audio, images, graphs, slides, charts, software programming code, designs, lists, plans, blueprints, maps, etc. Electronic document processing applications (e.g., a word processing application, a spreadsheet application, a presentation application) can be used to manipulate (e.g., create, edit, view, print, etc.) electronic documents. An electronic document processing application may be a local application hosted by a user device to manipulate local electronic documents stored on the user device. Alternatively, an electronic document processing application can be provided remotely from a client device, for example may be provided by a cloud-based management platform operating in a cloud-based environment which may enable a user to store data files on one or more servers in a cloud-based environment, synchronize the data files across various devices of the user, and share the data files with one or more other users. In some instances, the cloud-based content management platform may provide a single location to manage the data files for the user. The cloud-based content management platform may enable an author of an electronic document to invite other users to join as collaborators with respect to the electronic document stored at the cloud-based platform. An electronic document to which users have been granted permission to access or edit concurrently may be referred to as a collaborative document herein.

Some electronic document processing applications can allow a user of an electronic document to manually change the formatting of the electronic document for every part of the electronic document where the user desires a special formatting that deviates from the default formatting provided by the electronic document processing application. However, manually changing formatting consumes extensive network bandwidth and computer processing resources, for example where a client device is required to communicate with an electronic document processing application provided remotely from the client device. This may be particularly problematic where there is no wired connection between the client device and a remote electronic document processing application. Additionally, in cases where the user device is a portable device, the need for communication with a remote electronic document processing application may also consume significant electrical power, thereby reducing the time before the battery of the user device needs to be recharged. Manually changing formatting may also take a large amount of time, which further increases the network bandwidth and computer processing resources required.

Other electronic document processing applications can allow a user to manually create formatting rules to enable format changes using specialized key strokes that trigger the rules and change the default formatting to the desired formatting. Manually creating formatting rules is cumbersome. The available formatting rules may be limited and not comprehensive enough to cover the formatting changes a user desires. Additionally, creating formatting rules takes a great deal of time, and also consumes extensive network bandwidth and computer processing resources (for example where a client device is required to communicate with an electronic document processing application provided remotely from the client device).

Some electronic document processing applications can use models to help predict the formatting desired by a user of an electronic document. However, the models often lack the requisite accuracy and provide inaccurate suggestions. As such, network bandwidth and computer processing resources are wasted in predicting formatting having a low-probability of being accepted by the user.

Aspects and implementations of the disclosure address at least the above challenges, by using stored text records to confirm formatting suggestions. In an implementation, a text region in an electronic document is identified. A candidate text portion that is a candidate for applying a formatting suggestion in accordance with a formatting type (e.g., heading level) is identified in the text region by comparing the text region to a plurality of predetermined patterns. One or more stored text records that correspond to the candidate text portion can be identified. In some implementations, the stored text records can include words from additional text regions that previously had been determined to have satisfied at least one of the predetermined patterns. The formatting type may be confirmed as appropriate for the candidate text portion based on individual word matches between the candidate text portion and the stored text record. Responsive to confirming that the formatting type is appropriate for the candidate text portion, a user of the electronic document can be notified of the formatting suggestion according to the formatting type.

For example, as the user edits an electronic document, a text region in the electronic document is identified. The text region may be a portion of the text of the electronic document, such as two consecutive lines of the electronic document. The first line is a sentence. The second line is a subheading, e.g., "tactical goals". The user types the text without any additional formatting apart from the default formatting (e.g., Arial font, size 11). The text region is compared to predetermined patterns to identify a text unit (e.g., the subheading "tactical goals") in the text region that has a pattern (e.g., positioning in the document, a number of words, punctuation, a number of lines, preceding text, etc.) matching (or satisfying) at least one of the predetermined patterns. This identified text unit is a candidate to apply a formatting suggestion (e.g., Arial font, size 14, bold) in accordance with a formatting style or type (e.g., subheading level formatting type). The predetermined pattern is associated with a particular formatting type, in this instance a subheading level formatting type.

The candidate text portion may be compared to one or more stored text records. In some implementations, the stored text records may contain words of previous candidate text portions for which respective formatting suggestions were accepted by the user. In some implementations, the stored text records contain the words of previous candidate text portions for which a trained machine learning model suggested a formatting type that was appropriate for the previous candidate text portions. The stored text record can also contain metadata such as the formatting type associated with each of the words of the previous candidate text portions.

Continuing the above example, the stored text records are searched to identify words that correspond to words of the subheading, "tactical goal." Both "tactical" and "goal" are identified in the stored text records, in which both are associated with the formatting type, subheading level formatting type. Since the formatting type associated with the satisfied predetermined pattern matches the formatting type associated with words of the respective stored text records, the formatting type is confirmed and the formatting of the words "tactical goal" is automatically changed to a format associated with a subheading level formatting type (e.g., Arial font, size 14, bold).

In some implementations, to confirm whether the formatting type is appropriate for the candidate text portion, a trained machine learning model in conjunction with the stored text records may be used. The candidate text portion can be annotated with information from the stored text record to generate an annotated candidate text portion. The annotated candidate text portion can be used as input to the trained machine learning model. The annotated candidate text portion can improve the accuracy of the trained machine learning model, which helps predict more accurate and relevant formatting suggestions for a user of an electronic document.

For example, the stored text records are searched for words that correspond to words of the subheading, "tactical goal." Both "tactical" and "goal" are identified in the stored text records. In this instance in the respective stored text records, "tactical" is associated with a heading level 1 formatting type and "goal" is associated with a heading level 2 formatting type. Irrespective of whether any of the formatting types identified in the respective stored text records match the formatting type associated with the satisfied predetermined pattern, the candidate text portion is annotated with the metadata of the respective stored text records (e.g., [("tactical": heading level 1), ("goal": heading level 2)]. The annotated candidate text portion along with additional text of the text region (e.g., the sentence preceding "tactical goal") can be used as input to a trained machine learning model. The trained machine learning model may provide an output that identifies a formatting type (e.g., heading level 3 formatting type) for the candidate text portion and a level of confidence (e.g., 90%) that the formatting type is appropriate for the candidate text portion. The formatting type provided by the trained machine learning model may or may not be the same formatting type identified by the satisfied predetermined pattern or the same formatting type identified in the respective stored text records. The user may be notified of a formatting suggestion in accordance with the formatting type identified by the trained machine learning model. For instance, "tactical goal" may be changed to size 14 and underlined in accordance with a heading level 3 formatting type indicated by the output of the trained machine learning model. The stored text records can be updated using the output of the trained machine learning model. For instance, the words "tactical" and "goal" and the associated metadata, heading level 3 formatting type can be added as new entries to the stored text records.

As noted, a technical problem addressed by implementations of the disclosure is that large amounts of network bandwidth and computer processing resources are consumed by a text editing application over long periods of time because the formatting of electronic documents can be a slow and cumbersome process. For example, a user may spend a large amount of time formatting portions of the electronic document, which consumes computer processing resources and network bandwidth.

As also noted, another technical problem addressed by implementations of the disclosure is the lack of accuracy of models in predicting formatting suggestions for users of electronic documents. For example, many models have a low probability of predicting formatting suggestions that a user desires without explicit formatting instructions supplied by users. Setting up formatting rules and providing inaccurate formatting suggestions waste computer processing resources and network bandwidth.

A technical solution to the above identified technical problems may include identifying a text region in an electronic document, determining a candidate text portion in the text region based on a comparison of the text region with a plurality of predetermined patterns, identifying one or more stored text records that correspond to the candidate text portion, confirming the formatting type is appropriate for the candidate text portion based on individual word matches between the candidate text portion and the stored text record, and responsive to confirming that the formatting type is appropriate for the candidate text portion, notifying a user of the electronic document of the formatting suggestion according to the formatting type.

Thus, the technical effect may include reducing the overall bandwidth usage and computer processing usage of electronic document processing applications, for example where a client device is required to communicate with an electronic document processing application provided remotely from the client device. Additionally, the methods of the present disclosure may also reduce the overall time it takes users to format electronic documents. In the case of a portable user device, there is also the further effect of reduced power consumption and increased battery life.

Further technical effects may include improving the accuracy of models in predicting formatting suggestions for users of electronic documents. Improving the accuracy of such models may again contribute to more efficient use of bandwidth and computer processing resources.

It can be noted that aspects of the disclosure are described below with respect to cloud-based collaborative documents for purposes of illustration rather than limitation. Aspects of the disclosure may also be applied to electronic documents stored locally on a user computer and manipulated using an electronic document processing application running on the user computer.

FIG. 1 is an example of a system architecture 100, in accordance with implementations of the disclosure. The system architecture 100 includes a cloud-based environment 101 connected to client devices 110A-110Z (generally referred to as "client device(s) 110" herein) via a network 130. Although the system architecture 100 is described in the context of a cloud-based environment 101, which may enable communication between servers 112A-112Z (generally referred to as "server(s) 112" herein) in the cloud-based environment 101 and with client devices 110A-110Z over the network 130 to store and share data, it can be understood that the implementations described herein may also apply to systems that are locally interconnected. In implementations, the cloud-based environment 101 refers to a collection of physical machines that host applications (e.g., word processing application, spreadsheet application, slide presentation application, webpage application, etc.) providing one or more services (e.g., word processing, spreadsheet processing, slide generation for inclusion in a slide presentation, webpage processing, etc.) to multiple client devices 110A-110Z via the network 130.

The network 130 may be a public network (e.g., the Internet), a private network (e.g., a local area network (LAN) or wide area network (WAN)), or a combination thereof. Network 130 may include a wireless infrastructure, which may be provided by one or more wireless communications systems, such as a wireless fidelity (Wi-Fi) hotspot connected with the network 130 or a wireless carrier system that can be implemented using various data processing equipment, communication towers, etc. Additionally or alternatively, network 130 may include a wired infrastructure (e.g., Ethernet).

The cloud-based environment 101 may include one or more servers 112A-112Z, a training set generator 131, a training engine 141, or a data store 114. The training set generator, training engine 141, or the data store 114 may be separate from the servers 112A-112Z and communicatively coupled to the servers 112A-112Z. In some implementations, the training set generator 131, the training engine 141, or the data store 114 may be part of one or more of the servers 112A-112Z.

In implementations, data store 114 may store data file 116, predetermined patterns 117, formatting type 119, or stored text record 121. Contents of the data store 114 may further be described in the subsequent Figures.

In implementations, data store 114 may store a data file 116 that may include content (e.g., text, data tables, images, video, audio, etc.). In one implementation, the data file 116 may be any suitable data file including content that is uploaded to the cloud-based environment 101 by the client devices 110A-110Z or from a server within or outside of the cloud-based environment 101. In an implementation, the data file 116 may be an electronic document, such as a collaborative document that can be shared with users or be concurrently editable by users. In implementations, the term "concurrently editable" may refer to users concurrently modifying (e.g., adding, deleting, changing, etc.) content (e.g., text, cells, images, data, slides, etc.), concurrently suggesting changes to the content, concurrently making comments on the content, and the like.

In implementations, changes to the collaborative documents may be provided to or presented on client devices 110A-110Z in real-time. In implementations, real-time may refer to the transmission, presentation, or display of changes to a collaborative document to one or more client devices 110 as the changes are being made on different client devices. For example, real-time changes (e.g., edits) to a collaborative document may be displayed on a display of a client device 110A substantially concurrent with a user editing the collaborative document using client device 110Z (at least within the technical limitations of displaying real-time changes, e.g., the user edits to the collaborative document may be displayed within milliseconds of user input and may appear to the receiving user as if in absolute real-time).

In implementations, the collaborative document may be a word processing document, a spreadsheet document, a slide presentation document, a webpage document, or any suitable electronic document (e.g., an electronic document including content such as text, data tables, videos, images, graphs, slides, charts, software programming code, designs, lists, plans, blueprints, maps, etc.) that can be shared with users.

The collaborative document may be created by an author and the author may share the collaborative document with other users (e.g., collaborators). Sharing the collaborative document may refer to granting permission to the other users to access (view and/or edit) the collaborative document. Sharing the collaborative document may include informing the other users of the collaborative document via a message (e.g., email, text message, etc.) including a link to the collaborative document. The level of permissions that each user is granted may be based on the user type of each particular user. For example, a user with an editor user type may be able to open the collaborative document and make changes directly to the collaborative document. As such, numerous collaborators may make changes to the content presented in the collaborative document.

In implementations, cloud-based environment 101 may include a training set generator 131. In some implementations, the training set generator 131 may include a processing device or devices, such as a computer, microprocessor, logic device or other device or processor that is configured with hardware, firmware, or software to carry out some of the operations described herein. In some implementations, training set generator 131 may be part of one or more of servers 112A-112Z. Training set generator 131 is capable of generating training data (e.g., a set of training inputs and a set of target outputs) to train a machine learning model 160. In implementations, training set generator 131 generates training data that includes one or more training inputs, and one or more target outputs. The training data may also include mapping data that maps the training inputs to the target outputs. Training inputs may also be referred to as "features," "attributes," or "information." In some implementations, training set generator 131 may provide the training data in a training set, and provide the training set to the training engine 141 where the training set is used to train the machine learning model 160. For example, the training inputs may include text from a corpus of electronic documents, such as candidate text portions of the electronic documents (e.g., candidates to receive formatting suggestions) and contextual information associated with the candidate text portion (e.g., text before or after the candidate text portion). The target outputs may identify a formatting type for the candidate text portion.

In implementations, the training engine 141 may include a processing device or devices, such as a computer, microprocessor, logic device or other device or processor that is configured with hardware, firmware, and software to carry out some of the operations described herein. In some implementations, training engine 141 may be part of one or more of servers 112A-112Z. Training engine 141 is capable of training a machine learning model 160 using the training data from training set generator 131. The machine learning model 160 may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160 that captures these patterns.

In implementations, the machine learning model 160 may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. Once the machine learning model 160 is trained using training engine 141, the model may be referred to as a trained machine learning model 160.

In some implementations, the training set is sent from training set generator 131 to training engine 141. Training engine 141 uses the training set as input to train the machine learning model 160. Once trained, the trained machine learning model 160 can receive new input to produce one or more outputs. For example, inputs to the trained machine learning model 160 can include an annotated candidate text portion (e.g., the candidate text portion with additional metadata). In some example, the inputs to the trained machine learning model 160 can also include a remaining portion of the text region of an electronic document. The outputs of the trained machine learning model 160 may identify a format identifier indicative of a formatting type. The output of the trained machine learning model 160 may include confidence data that indicates a level of confidence that the formatting type is appropriate for the candidate text portion.

In some implementations, confidence data may include or indicate a level of confidence that the formatting type is appropriate for the candidate text portion. In one example, the level of confidence is a real number between 0 and 1 inclusive, where 0 indicates no confidence that the formatting type is appropriate for the candidate text portion and 1 indicates absolute confidence that the formatting type is appropriate for the candidate text portion.

Also as noted above, for purpose of illustration, rather than limitation, aspects of the disclosure describe the training of a machine learning model and use of a trained machine learning model using information pertaining to electronic documents. In other implementations, a heuristic model or rule-based model to determine or confirm whether the formatting type is appropriate for the candidate text portion, as further described herein.

The servers 112A-112Z may be physical machines (e.g., server machines, desktop computers, etc.) that each include one or more processing devices communicatively coupled to memory devices and input/output (I/O) devices. The processing devices may include a computer, microprocessor, logic device or other device or processor that is configured with hardware, firmware, and software to carry out some of the implementations described herein. Each of the servers 112A-112Z may host a format suggestion module 118A-118Z (generally referred to as "format suggestion module(s) 118" herein). The format suggestion modules 118A-118Z may be implemented as computer instructions that are executable by one or more processing devices on each of the servers 112A-112Z. The format suggestion modules 118A-118Z may perform the operations described with respect to the following Figures.

In implementations, one or more of the servers 112A-112Z may provide a collaborative document environment 122A-122Z (generally referred to as "collaborative document environment(s) 122" herein) to the client devices 110A-110Z. The server 112A-112Z selected to provide the collaborative document environment 122A-122Z may be based on certain load-balancing techniques, service level agreements, performance indicators, or the like. The collaborative document environment 122A-122Z may provide a user interface 124A-124Z that displays a collaborative document generated based on content in the one or more data files 116. The collaborative document environment 122A-122Z may enable users using different client devices 110A-110Z to concurrently access the collaborative document to review, edit, view, and/or propose changes to the collaborative document in a respective user interface 124A-124Z.

In an implementation, the user interfaces 124A-124Z may be web pages rendered by a web browser and displayed on the client device 110A-110Z in a web browser window. In another implementation, the user interfaces 124A-124Z may be included in a stand-alone application downloaded to the client device 110A-110Z and natively running on the client devices 110A-110Z (also referred to as a "native application" or "native client application" herein).

The client devices 110A-110Z may include one or more processing devices communicatively coupled to memory devices and I/O devices. The client devices 110A-110Z may be desktop computers, laptop computers, tablet computers, mobile phones (e.g., smartphones), or any suitable computing device. The client device 110A-110Z may include components, such as an input device and an output device. A user may be authenticated by the server 112A-112Z using a username and password (or other identification information) provided by a user via the user interface 124A-124Z, such that the same client device 110A-110Z may be used by different users at different times.

As discussed above, the client devices 110A-110Z may each include a web browser or a native client application. A user that is invited and becomes a collaborator of the collaborative document may request to access the collaborative document via the web browser or the native client application. For example, the user may select the collaborative document from the user interface 124A provided by the cloud-based environment and presented by the web browser or the native client application. As such, the client device 110A associated with the user may request the collaborative document from the cloud-based environment 101. The collaborative document environment 122A-122Z may enable a user to view and/or manage collaborative documents, with which they are associated, within a respective user interface 124A-124Z.

The collaborative document environment 122A-122Z may also enable users using different client devices 110A-110Z to simultaneously access the collaborative document to comment on, edit (e.g., modify or suggest changes), or view the collaborative document in a respective user interface 124A-124Z of the respective collaborative applications (e.g., collaborative slide presentation application, collaborative word processing application, collaborative spreadsheet application, collaborative webpage application) that presents the collaborative document.

In some implementations, the format suggestion module 118A-118Z may be a part of client device 110A-110Z. For example, in some implementations, the client device 110A-110Z may have a locally installed application including the format suggestion module 118A-118Z to generate format suggestions for a collaborative document associated with user. In some implementations, one or more of data file 116, predetermined patterns 117, formatting type 119, or stored text records 121 may be stored local to client devices 110A-110Z. In some implementations, client devices 110A-110Z may wholly execute format suggestion modules 118A-118Z to generate format suggestions for an electronic document, such as a collaborative document. It may be noted that format suggestion modules 118A-118Z of client devices 110A-110Z may be the same or similar to format suggestion modules 118A-118Z of servers 112.

In some implementations, cloud-based environment 101 may wholly execute format suggestions modules 118A-118Z to generate format suggestions for a collaboration document. In other implementations, operations of format suggestion modules 118A-118Z may be divided among servers 112A-112Z and client devices 110A-110Z.

In some implementations, format suggestion modules 118A-118Z of client devices 110A-110Z may be applied to electronic documents stored locally on a client device, such as electronic document executed and manipulated by using an electronic document word processing application running on the user computer. A machine learning model 160 may be trained using servers 112A-112Z. The trained machine learning model 160 may be distributed to client devices 110A-110Z of use by the local electronic document word processing application to predict formatting styles.

In situations in which the systems discussed here collect personal information about users, or may make use of personal information, the users may be provided with an opportunity to control whether the cloud-based environment 101 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the cloud-based environment 101.

Figure 2:
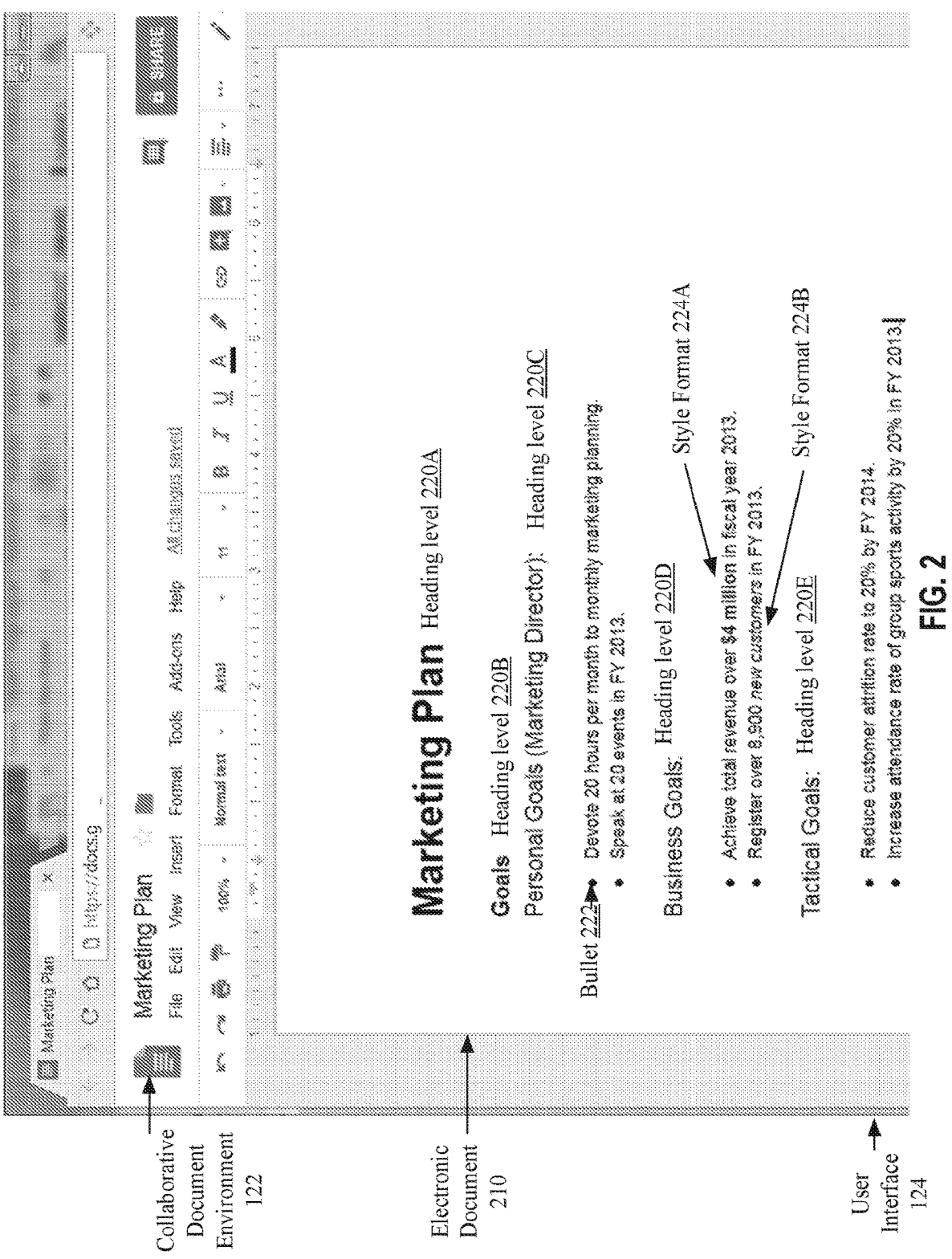
FIG. 2 illustrates a user interface displaying an electronic document, in accordance with implementations of the disclosure.

FIG. 2 illustrates a user interface displaying an electronic document, in accordance with implementations of the disclosure. Elements of FIG. 1 are used in FIG. 2 to help illustrate aspects of the disclosure. For purposes of illustration, rather than limitation, electronic document 210 is illustrated as a collaborative document (herein after referred to as "collaborative document 210").

As illustrated, a collaborative document environment 122 is provided by server 112 and displayed via the user interface 124. The collaborative document 210 is open in a collaborative word processing application provided by the collaborative document environment 122 in a browser window. It can be noted that in other implementations, the collaborative document environment 122 may be displayed in the user interface 124 of a native application at the client device 110 without using a browser. The collaborative document 210 may be stored in data file 116 at server 112 of cloud-based environment 101. In some implementations, collaborative document 210 is an electronic documents stored locally on a client device 110, such as electronic document executed and manipulated by using an electronic document word processing application running on the client device 110.

As a user is typing text in collaborative document 210, format suggestion module 118 can notify the user of the collaborative document 210 of formatting suggestions. Collaborative document 210 of FIG. 2 is illustrated with applied formatting suggestions to help describe features of the present disclosure. Collaborative document 210 contains text. Text may refer to any content of the collaborative document 210 and may include alpha characters, numeric characters, alphanumeric characters, words, punctuation, spaces, carriage returns (also referred to as a "return" herein), symbols, or any characters represented by American Standard Code for Information Interchange (ASCII) code, and so forth.

Format may refer to the presentation structure of text in an electronic document, such as collaborative document 210. Styling format (also referred to as "style format" herein) may refer to the presentation parameters of characters in the text and includes font type, font size, font weight (e.g., bold, center narrow), italics, font case, highlighting, font color, and so forth. Layout format may refer to the layout parameters of the text and includes indentations, paragraph styles, spacing, horizontal spacing between characters or words, vertical spacing between lines, page layout parameters, indent, bulleting (e.g., numbers and symbols), among others.

Collaborative document 210 illustrates a number of formatting types 119 (e.g., heading level formatting types, bullet formatting types, style formatting types), where different formatting types 119 may have different presentation or layout parameters. For instance, heading levels 220A-220E (generally referred to as "heading level(s) 220" herein) are examples of text having different heading level formatting types. Heading levels are used in electronic documents to separate, indicate, and classify sections of text, and help guide a reader through the electronic document. Heading levels are organized in relation to one another and organized by levels of subordination. For instance, a heading level 1 (H1) is a first heading level of an electronic document and may be, for example, the tile of a collaborative document 210. Heading level 220A ("Marketing Plan") is an example of text having a heading level 1 formatting type. A particular format can be applied to text having a heading level 1 formatting type. For instance, "Marketing Plan" is shown with font size 24, bold, and a particular vertical spacing between it and the below text ("Goals").

In another example, a heading level 2 (H2) may be a second heading level of an electronic document and be subordinate to heading level 1. Heading level 2 may follow, directly or indirectly, a heading level 1 in the electronic document. For instance, a heading level 2 may be the subheading of the electronic document. Heading level 220B ("Goals") is an example of text having a heading level 2 formatting type. A particular format can be applied to text having a heading level 2 formatting type. The particular format for text having a heading level 2 formatting type may be different for text having a heading level 1 formatting type. For instance, "Goals" is shown with font size 14 and bold.

In another example, a heading level 3 (H3) may be a third heading level of an electronic document and be subordinate to heading level 1 and heading level 2. Heading level 3 may follow, directly or indirectly, a heading level 1 and a heading level 2 in the electronic document. For instance, a heading level 2 may be a subheading of the electronic document. Heading levels 220C-220E (e.g., "Personal Goals (Marketing Director):") are examples of text having a heading level 3 formatting type. A particular format can be applied to text having a heading level 3 formatting type. For instance, "Personal Goals (Marketing Director):" is shown with font size 14, no bold, and a vertical spacing between it and the below text. It can be noted that heading levels 1-3 are provided for purposes of illustration, rather than limitation. An electronic document can include any number of heading levels.

Collaborative document 210 illustrates a bullet formatting type. For instance, bullet 222 is an example of text having a bullet formatting type. Bullets (also referred to as "bullet points" herein) are used for emphasis and may emphasize text following the bullet. In implementations, a particular format can be applied to the bullet formatting type. For example, the format may be a dot of a particular size as illustrated. Other formats for a bullet formatting type can include numbers or symbols of particular shapes and sizes.

Collaborative document 210 illustrates style formatting types. For instance, style format 224A and 224B are examples of text having style formatting types. Style formatting types may have particular styling formats (i.e., presentation of characters in the text). For example, style format 224A shows the applied styling format of bold on the text "$4 million". In another example, style format 224B shows the applied styling format of italics on the text "new customers". It can be noted the formatting types described with respect to FIG. 2 are provided for illustration, rather than limitation, and are by no means exhaustive. Aspects of the disclosure may be applied to other formatting types. It can also be noted that format suggestion module 118 can provide formatting suggestions in accordance to the formatting type described herein as well as other formatting types.

FIGS. 3A-3C illustrates operations for notifying a user of an electronic document of a formatting suggestion, in accordance with implementations of the disclosure. Elements of FIGS. 1 and 2 are used in FIGS. 3A-3C to help illustrate aspects of the disclosure. In some implementations, format suggestion module 118 may perform one or more of the operations described with respect to FIGS. 3A-3C. As noted above, format suggestion module 118 may be executed at client device 110, server 112, or a combination thereof to perform the operations described with respect to FIGS. 3A-3C.

FIG. 3A illustrates an electronic document for which operations to determine that the text region includes a candidate text portion are performed, in accordance with implementations of the disclosure. As illustrated, a user has entered a first line of text, "Marketing Plan," followed by two successive carriage returns. The user has added no formatting other than the default formatting (e.g., Arial font, size 11) associated with collaborative document 210.

In implementations, format suggestion module 118 may identify a text region 315 in a collaborative document 210. A text region may be a part of an electronic document that includes some amount of text. In implementations, a text region includes consecutive text. For example, a text region may include text of part of a line, a single line, or multiple consecutive lines (e.g., N number of lines) of collaborative document 210. In the current example, the text region 315 includes two consecutive lines of collaborative document 210, a first line with the words "Marketing Plan" followed by a carriage return, and a second line with a carriage return and no words. The candidate text portion 320 includes "Marketing Plan". The candidate text portion 320 is a candidate for applying a formatting suggestion in accordance with a formatting type 119.

In implementations, format suggestion module 118 may compare text region 315 with one or more predetermined patterns 117. A predetermined pattern 117 may be used to identify whether a text region 315 contains a candidate text portion 320. The predetermined pattern may be used to identify the part of the text region 315 that includes the candidate text portion 320. A predetermined pattern 117 may refer to a pattern of text in an electronic document. The predetermined pattern 117 can include one or more criteria. A predetermined pattern 117 may be implemented using a particular N-Gram, a particular regular expression, a particular bag-of-words model, custom criteria, or a combination thereof. Each of the predetermined patterns 117 can be associated with a respective one of the formatting types 119, such as the formatting types described with respect to FIG. 2.

In some implementations, based on the comparison of the text region 315 with one or more predetermined patterns 117, format suggestion module 118 may determine that the text region 315 satisfies a particular predetermined pattern 117. For example, to satisfy the particular predetermined pattern 117, the text region 315 may match the criteria of the particular predetermined pattern 117. The criteria of the particular predetermined pattern 117 may identify the candidate text portion 320 of the text region 315.

In some implementations, the satisfaction of a predetermined pattern 117 may identify a text unit (e.g., at least part of the text region) of the text region 315 that is the candidate text portion 320. In some implementations, the satisfaction of a predetermined pattern 117 may identify text unit(s) of the text region 315 that is not the candidate text portion 320. A text unit may refer to at least a part of the text region 315. In some implementations, the text unit may include the entire text region 315.

In some implementations, the text unit is a sequence of consecutive text, such as consecutive words, consecutive characters, or a combination thereof. In some implementations, the text unit can be a sentence or phrase. A sentence may end in punctuation, such as a period or question mark. A sentence may start at a new line, after punctuation, such as a period of a preceding sentence, or combination of both. A phrase may end without punctuation. A phrase may end with a carriage return rather than punctuation.

In implementations, each of the predetermined patterns 117 can be associated with a respective one of the formatting types 119, such as the formatting types described with respect to FIG. 2. For example, the criteria of particular predetermined pattern 117 may be derived from text having a particular formatting type. In can be noted that the formatting type associated with a particular satisfied predetermined pattern 117 may or may not be the same formatting type associated with the formatting suggestion.

In an example as illustrated in FIG. 3A, the text region 315 includes two lines of collaborative document 210. The text region 315 in the current example may be compared to one or more predetermined patterns 117, such as a heading level pattern. The heading level pattern can include criteria, such as a word frequency threshold and punctuation criteria. The heading level pattern may be used to find a candidate text portion.

In implementations, the format suggestion module 118 may compare the text region 315 with punctuation criteria of the heading level pattern. For example, the punctuation criteria may call for the text unit (e.g., "marketing plan") of the text region 315 to end with a carriage return. In another example, the punctuation criteria may call for the text unit of the text region 315 to end with a carriage return and not include punctuation (e.g., a period) preceding the carriage return that would indicate that the text unit is a sentence. In the current example as illustrated in FIG. 3A, "marketing plan" ends with a carriage return, which satisfies the punctuation criteria that the text unit, "marketing plan", ends with a carriage return.

In some implementations, format suggestion module 118 may compare the text region 315 to a word frequency threshold. For example, a word frequency threshold may call for the text unit (e.g., "marketing plan") to be equal or less than N-number of words (e.g., 7 words). In the current example as illustrated in FIG. 3A, format suggestion module 118 may determine whether the text region satisfies a word frequency threshold. The format suggestion module 118 compares the text unit of the text region 315 to a word frequency threshold. If the number of words in text unit of the text region 315 is less than or equal to the word frequency threshold (e.g., N-number of words, such as 7 words), format suggestion module 118 may determine that the text region 315 satisfies the word frequency threshold criterion. In the current example, "marketing plan" includes 2 words, which satisfies the word frequency threshold of 7 words.

In the current example as illustrated in FIG. 3A, responsive to determining that the text unit of the text region 315 satisfies the word frequency threshold and the punctuation criteria, format suggestion module 118 determines that text region 315 satisfies the heading level pattern. Responsive to determining that the text unit of the text region 315 satisfies the word frequency threshold and the punctuation criteria, format suggestion module 118 identifies "Marketing Plan" as candidate text portion 320. The format suggestion module 118 identifies the remaining text unit(s) (e.g., the second line of text region 315) as the remaining text portion of text region 315. In some implementations, the heading level pattern may identify candidate text portions that may be a heading level generally, rather than identify a specific heading level (e.g., heading level 1, heading level 2, etc.). The heading level pattern may be associated with a particular formatting type, such as a general heading level formatting type.

In some implementations, the heading level 1 pattern may include additional criteria in addition to the heading level pattern, as described above. The additional criteria may call for the text unit of text region 315 to include initial text of the collaborative document 210. For example, format suggestion module 118 may determine whether the text unit, "Marketing Plan", of text region 315 includes initial text of the collaborative document 210. For instance, if text unit, "Marketing Plan", is preceded by no other words, or at least by no other sentence, the text unit can be considered as the initial text of the collaborative document 210. Since "Marketing Plan" satisfies the word frequency threshold, the punctuation criteria, and the additional criteria (e.g., includes initial text of the collaborative document 210), format suggestion module 118 determines that the text region 315 satisfies the heading level 1 pattern and identifies "Marketing Plan" as the candidate text portion 320. The heading level 1 pattern may be associated with a particular formatting type, such as a heading level 1 formatting type. In can be noted that in implementations, a text region may satisfy one or more predetermined patterns 117.

In some implementations, a subordinate heading level pattern, such as a heading level 2 pattern or a heading level 3 pattern, may include additional criteria in addition to the heading level pattern, as described above. The additional criteria may call for another text unit of text region to include a sentence that precedes the candidate text portion 320. For example, format suggestion module 118 may determine whether another text unit of text region 315 includes a sentence that precedes the text unit "Marketing Plan". Since "Marketing Plan" is not preceded by a sentence, text region 315 does not satisfy the subordinate heading level. The subordinate heading level pattern may be associated with a particular formatting type, such as a subordinate heading level formatting type.

In one example, a text region that includes "Business Goals" as illustrated in FIG. 2 at heading level 220D satisfies a subordinate heading level pattern. "Business Goals" ends with a carriage return, which satisfies the punctuation criteria that the text unit ends with a carriage return. "Business Goals" includes 2 words, which satisfies the word frequency threshold of 7 words. Another text unit of text region (e.g., "Speak at 20 events in FY 2013.") includes a sentence that precedes the text unit, "Business Goals". Responsive to determining that the text unit (e.g., "Business Goals") of the text region satisfies the word frequency threshold and the punctuation criteria and another text unit of the text region includes a sentence that precedes the text unit (e.g., "Business Goals") of the text region, format suggestion module 118 determines that text region satisfies the subordinate heading level pattern. Responsive to determining that the text unit of the text region satisfies the above criteria, format suggestion module 118 identifies "Business Goals" as candidate text portion.

In some implementations, an additional subordinate heading level pattern, such as a heading level 2 pattern or heading level 3 pattern, may include still additional criteria in addition the subordinate level pattern, as described above. The additional criteria may call for another text unit of the text region that follows the text unit (e.g., candidate text portion) to include at least part of a sentence that includes at least some of the words of the candidate text portion. The additional subordinate heading level pattern may be associated with a particular formatting type, such as an additional subordinate heading level formatting type.

In some implementations, a predetermined pattern 117 can include a bag-of-words model. Format suggestion module 118 may determine that the text region satisfies a bag-of-words model. Responsive to determining that that the text region satisfies the bag-of-words model, format suggestion module 118 determines that the text region satisfies the predetermined pattern 117, which identifies a candidate text portion in the text region. Bag-of-words model is further described below.

In implementations, a predetermined pattern 117 may be determined by an administrator, a model, or otherwise. In some implementations, a user may not determine or create a predetermined pattern. A predetermined pattern 117 may be indicative of a respective formatting type 119. As noted above, predetermined patterns 117 may be stored at client device 110 or cloud-based environment 101.

In implementations, a predetermined pattern 117 may be implemented or expressed as a particular N-gram, such a uni-gram or higher order N-gram. An N-gram may refer to a consecutive sequence of n items, such as n words, from a given sample of text. For example, the uni-gram "Introduction" may be a predetermined pattern 117.

In implementations, a predetermined pattern 117 may be implemented or expressed as a particular regular expression. A regular expression may refer to a special text string that describes a search pattern. The special text string may include a regular character that has a literal meaning and a meta character having a special meaning. For example, in the regular expression "a.", "a" is a literal character which matches the character "a", while "." is a meta character that matches every character except a newline (e.g., matches "a", "ax", or "a0").

In implementations, a predetermined pattern 117 may be implemented or expressed as a particular bag-of-words model. A bag-of-words model may refer to a model where the text is represented as a bag or multiset of its words, disregarding grammar or word order but keeping the multiplicity. For example, in a bag-of-words model the model may include a list of words and a frequency of each of the words (e.g., {"people":1, "nation":2}. In the example, a text region that includes the words "people" and two instances of "nation" would satisfy the particular bag-of-words model.

FIG. 3B illustrates stored text records used in operations with respect to format suggestion module, in accordance with implementations of the disclosure. Stored text records 121 include any number of stored text records (also referred to as "entries" herein), such as stored text record 322A-322N. As noted above, stored text records 121 may be stored at cloud-based environment, client device 110, or a combination thereof.

In some implementations, the stored text records 121 may contain words of previous candidate text portions whose respective text regions were found to satisfy at least one of the predetermined pattern 117. In some implementations, the stored text records 121 may contain words of previous candidate text portions for which the user was notified of respective formatting suggestions. In some implementations, the stored text records 121 may contain words of previous candidate text portions for which respective formatting suggestions were accepted by the user. In some implementations, the stored text records 121 contain the words of previous candidate text portions for which a trained machine learning model 160 suggested a formatting type 119 that was appropriate for the previous candidate text portions. The stored text records 121 can also contain metadata such as the formatting type 119 and count 330 associated with each of the words of the previous candidate text portions. The stored text records 121 can also contain other text of the text regions associated with the previous candidate text portions. In some implementations, the stored text records 121 can include other types of metadata.

As illustrated in FIG. 3B, text 325 includes words of previous candidate text portions as described above. Count 330 is indicative of the number of occurrences of the respective word in the previous candidate text portions having a particular formatting type 119. Formatting type 119 of stored text records 121 indicates the formatting type associated with previous candidate text portions that contained the respective word in text 325. For example, stored text record 322A indicates there have been 8 instances of the word "plan" in one or more previous candidate text portions. It can be noted that different entries of stored text records 121 may have the same words but different associated formatting types 119.

In implementations, information associated with count 330 or information associated with formatting type 119 of stored text records 121 may be referred to as metadata of the respective word of text 325. For example, in stored text record 322B the count of 6 and the formatting type 119 of heading level 2 formatting type is metadata for the word "goals" of text 325.

In some implementations, stored text records 121 include information (e.g., text 325, count 330, or formatting type 119) from the current collaborative document 210 on which the user is currently working. In some implementations, the stored text records 121 include information from one or more electronic documents on which the user had previously been working. In implementations, the stored text records 121 include information from the collaborative document 210 on which the user is currently working and information from one or more electronic document on which the user had previously been working.

In some implementation, stored text records 121 are user-specific and associated only with a particular user. For example, the stored text records 121 may be populated with only text that the particular user contributed to the one or more electronic documents. In an implementation, the stored text records 121 may be continually updated as a user works on one or more electronic documents over a time period. The stored text records 121 may "travel" with the user so that as the user uses different applications (e.g., word processing application, slide presentation application, etc.) of cloud-based environment 101 or uses the same application at different points in time, the stored text records 121 can be used to provide formatting suggestions or be updated.

In some implementations, format suggestion module 118 may identify, among the stored text records 121, one or more entries of stored text record 121, such as stored text record 322A, that corresponds to the candidate text portion 320. Format suggestion module 118 may search the stored text records 121 to identify entries with words that match (or are similar to, such as an abbreviation, or acronym of a word) words in the candidate text portion 320.

For example as described in FIG. 3A, the candidate text portion 320 is "Marketing Plan". The word, "marketing" is not found in the stored text records 121. The word, "plan" is identified in stored text record 322A.

In some implementations, format suggestion module 118 may confirm whether the formatting type is appropriate for the candidate text portion 320 based on individual word matches between the candidate text portion 320 and one or more stored text records 322A-322Z. In some implementations, confirming whether the formatting type is appropriate for the candidate text portion 320 may include finding one or more words (e.g., a threshold number or percentage of words) of the candidate text portion 320 that match respective one or more words (e.g., text 325) of stored text record 322. If a match(s) is found, the formatting type 119 associated with the one or more matching words (e.g., text 325) of stored text record 322 can be confirmed as an appropriate formatting type 119 for the candidate text portion 320.

For example, the word, "plan" of candidate text portion 320 matches the word "plan" of stored text record 322A. The formatting type 119 of stored text record 322A is heading level 1 formatting type. Format suggestion module 118 may identify that formatting type 119 of stored text record 322A associated with the matching word "plan" is a heading level 1 formatting type and confirm the heading level 1 formatting type is appropriate for the candidate text portion (irrespective of whether the formatting type of the satisfied predetermined pattern 117 is the same or different).

In some implementations, confirming whether the formatting type is appropriate for the candidate text portion 320 may include finding one or more words of the candidate text portion 320 that match respective one or more words (e.g., text 325) of stored text record 322. If the formatting type associated with the matched words in the stored text records 121 is the same as the formatting type of the satisfied predetermined pattern, the formatting type of the satisfied predetermined pattern can be confirmed as the appropriate formatting type for the candidate text portion 320. In some implementations, if multiple formatting types 119 are associated with multiple matching words (e.g., text 325) of stored text record 322, the formatting type associated with satisfied predetermined pattern 117 (e.g., that identified the candidate text portion 320) can used as a "tie break" to confirmed whether a formatting type is appropriate for the candidate text portion 320.

For example, the word, "plan" of candidate text portion 320 matches the word "plan" of stored text record 322A. The formatting type 119 of stored text record 322A is heading level 1 formatting type. The word "marketing" of candidate text portion matches the word "marketing" of another stored text record (not shown). The formatting type of the other stored text record is style formatting type (not shown). The formatting type of the satisfied predetermined pattern 117 is heading level 1 formatting type, which breaks a tie between the heading level 1 formatting type and style formatting type. Format suggestion module 118 may confirm that the heading level 1 formatting type is appropriate for candidate text portion 320.

In some implementations, if multiple formatting types 119 are associated with multiple matching words (e.g., text 325) of stored text record 322, format suggestion module 118 may confirm the formatting type associated with a majority of the matching words as the formatting type that is appropriate for the candidate text portion 320.

Figure 5:
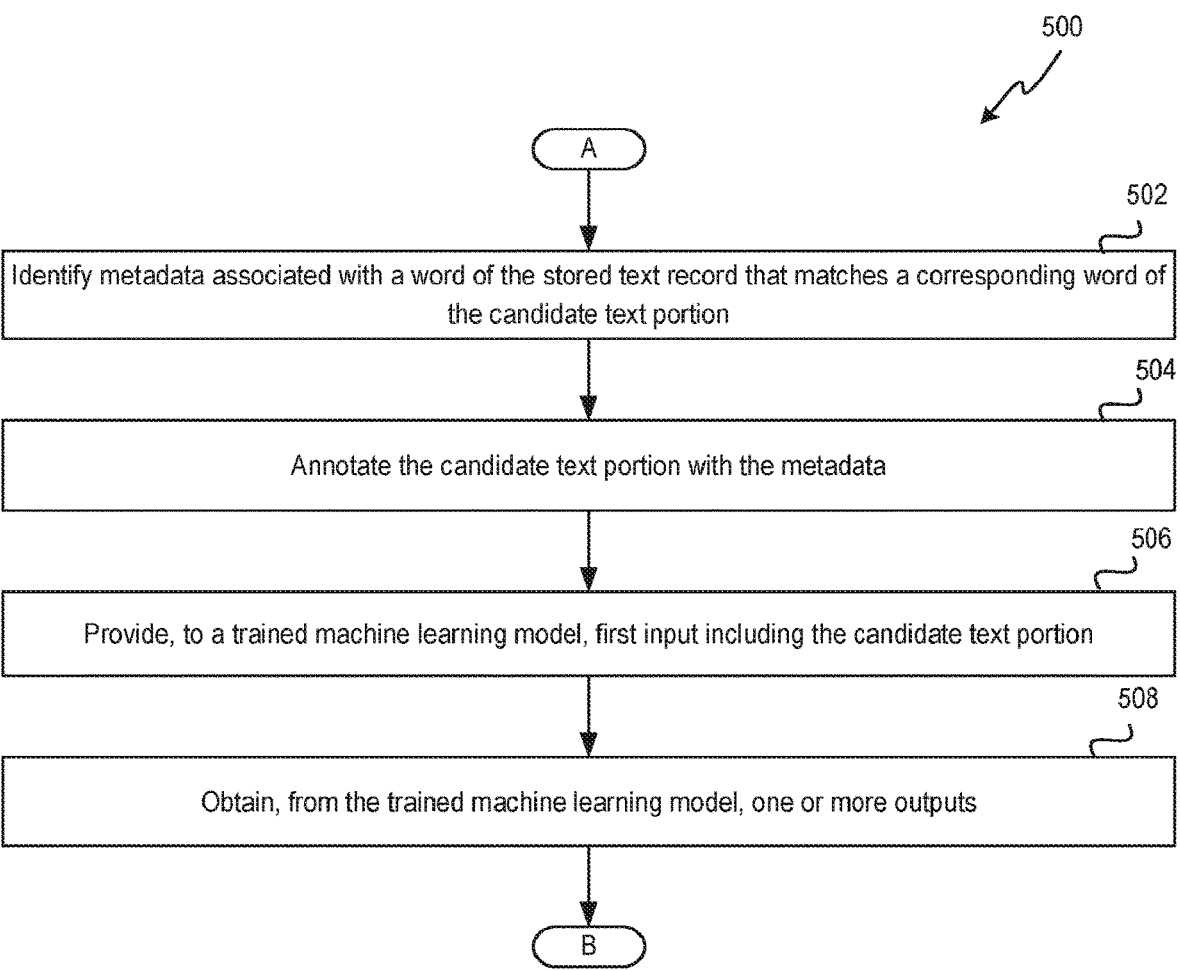
FIG. 5 is a flow diagram illustrating a method for confirming whether the formatting type is appropriate for the candidate text portion, in accordance with implementations of the disclosure.

Examples of confirming the formatting type using a trained machine learning model 160 is further described with respect to FIG. 5.

In some implementations, stored text records 121 may be updated. In some implementations, the stored text records 121 may be updated with words of previous candidate text portions that were found to satisfy at least one of the predetermined patterns 117. The formatting type associated with the satisfied predetermined pattern 117 can be used as the metadata of stored text records 121.

In other implementations, the stored text records 121 may be updated using words of previous candidate text portions for which the user was notified of respective formatting suggestions.

In some implementations, the stored text records 121 may be updated using words of previous candidate text portions for which respective formatting suggestions were accepted by the user. For example, if the user accepts the formatting suggestion, the stored text records 121 may be updated. Accepting the formatting suggestion may include active acceptance, such as selecting the formatting provided by the formatting suggestions using user input. Accepting the formatting suggestion may include passive acceptance, such as not undoing the automatic format suggestion.

In some implementations, the stored text records 121 may be updated using words of previous candidate text portions for which a trained machine learning model 160 suggested a formatting type that was appropriate for the previous candidate text portions. For example, if the level of confidence that the formatting type is appropriate for the candidate text portion exceeds a threshold confidence level, the stored text records 121 may be updated using the respective candidate text portion and the formatting type indicated by the trained machine learning model 160.

In an example of updating the stored text records 121, format suggestion module 118 may add "marketing" to the text 325 of the stored text records 121, set the count 330 associated with "marketing" to 1, and set the formatting type 119 associated with "marketing" to heading level 1 [H1]. For the word "plan", format suggestion module 118 may increase the count of stored text record 322A by 1 (e.g., count=9).

FIG. 3C illustrates an electronic document for which operations to notify user of formatting suggestion are performed, in accordance with implementations of the disclosure. In some implementations, responsive to confirming that the formatting type is appropriate for the candidate text portion 320, format suggestion module 118 notifies a user of the collaborative document 210 of the formatting suggestion according to the formatting type. For purposes of illustration, rather than limitation, the formatting type of FIG. 3C is a heading level 1 formatting type.

In some implementations, notifying the user of collaborative document 210 of the formatting suggestion includes automatically formatting the candidate text portion 320 according to the formatting type 119, such as heading level 1 formatting type. For example, after the user finishes typing "Marketing Plan," the words of "Marketing Plan" can be formatted in accordance with a heading level 1 formatting type. In this example, "Marketing Plan" is presented in font size 24 and bolded in accordance with a heading level 1 formatting type.

In some implementations, to determine the formatting for a particular formatting type 119, format suggestion module 118 may identify the settings (e.g., default or user-created setting) associated with the document. For example, format suggestion module 118 may identify from the document settings that all text having a heading level 1 formatting type is to be presented in font size 24 and bold.

In some implementations, notifying the user of collaborative document 210 of the formatting suggestion includes giving the user an option, such as via a user interface element, to select the formatting suggestion. For example, after typing "marketing plan" the user may be presented with a user interface element, which responsive to being selected, causes the formatting of "marketing plan" to be changed in accordance with the heading level 1 formatting type. In implementations, the user may actively accept the formatting suggestions. Format suggestion module 118 may provide the candidate text portion 320 with the applied formatting suggestion for presentation in the collaborative document 210 in response to the active acceptance by the user.

In some implementations, notifying the user of collaborative document 210 of the formatting suggestion includes giving the user an option, such as via a user interface element, to preview the formatting suggestion. For example, after typing "marketing plan" the user may be presented with a user interface element, which responsive to being selected, causes a preview of "marketing plan" to be presented in a format in accordance with heading level 1 formatting type. The user may further accept or reject the formatting suggestion of "marketing plan". If the user accepts the formatting suggestion, format suggestion module 118 may provide the candidate text portion 320 in the applied formatting suggestion for presentation in the collaborative document 210. If the user rejects the formatting suggestion, format suggestion module 118 may provide the candidate text portion in the previous formatting for presentation in the collaborative document 210.

Figure 4:
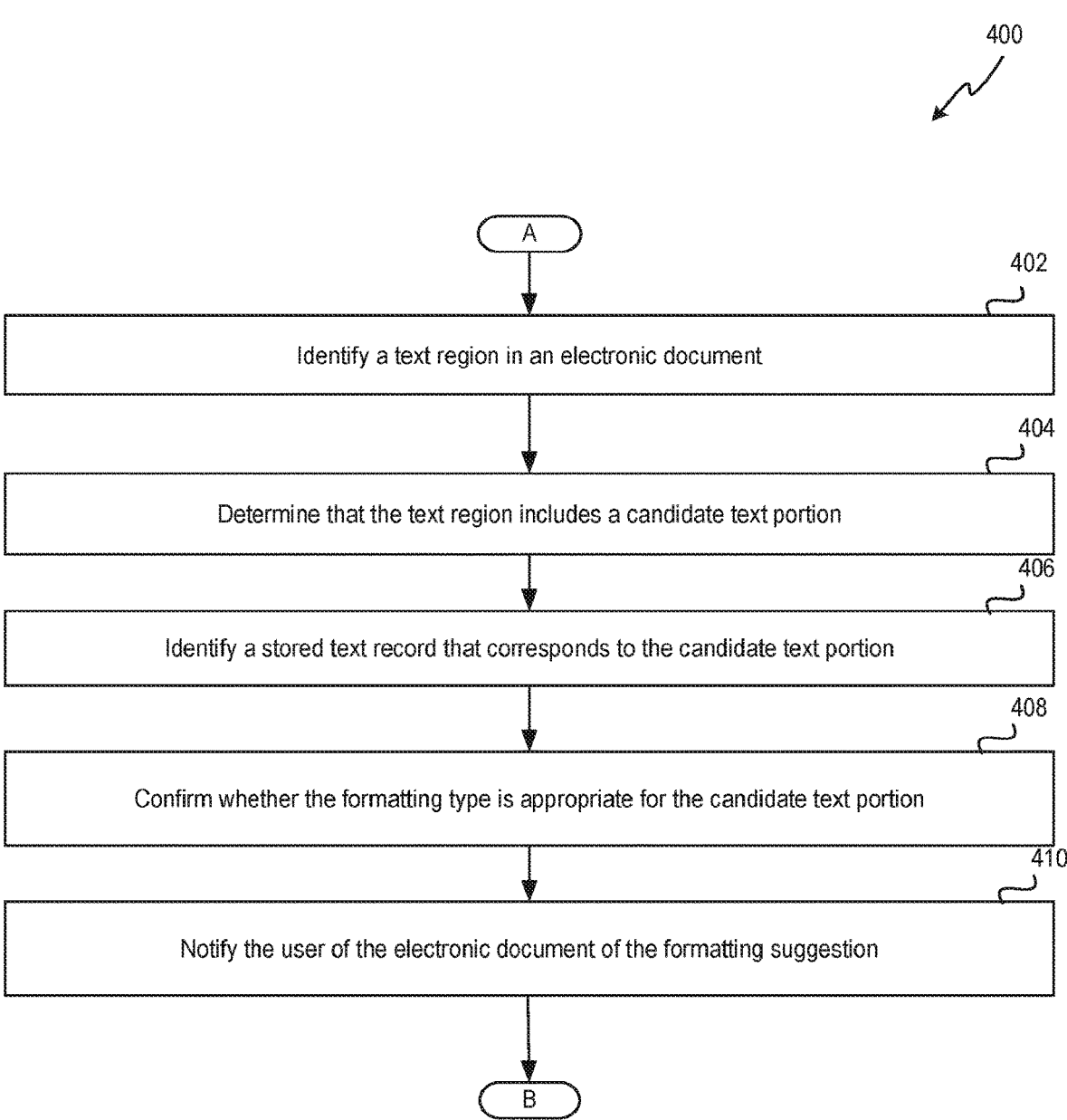
FIG. 4 is a flow diagram illustrating a method for notifying a user of a formatting suggestion for an electronic document, in accordance with implementations of the disclosure.

FIG. 4 is a flow diagram illustrating method 400 for notifying a user of a formatting suggestion for an electronic document, in accordance with implementations of the disclosure. Method 400 may be performed by processing logic that includes hardware (e.g., circuitry, dedicated logic, programmable logic, microcode), software (e.g., instructions run on a processing device to perform hardware simulation), or a combination thereof. In some implementations, format suggestion module 118 executing at client device 110 may perform some or all the operations. In other implementations, format suggestion module 118 executing at sever(s) 112 may perform some or all the operations. In some implementations, format suggestion module 118 executing at client device 110 and server(s) 112 may perform some or all the operations. Elements of FIGS. 1, 2, and 3A-3C may be used to help illustrate method 400. It may be noted that the in some implementations, method 400 may include the same, different, fewer, or a greater number of operations performed in any order.

At block 402, processing logic executing method 400 identifies a text region in the electronic document.

At block 404, processing logic determines that the text region includes a candidate text portion that is a candidate to apply a formatting suggestion. The formatting suggestion may be in accordance with a formatting type of multiple formatting types. The determining that the text region includes a candidate text portion may be based on a comparison of the text region with one or more or predetermined patterns.

In some implementations, determining that the text region includes the candidate text portion that is the candidate for applying the formatting suggestion in accordance with the formatting type is performed concurrently with the user editing the electronic document.

At block 406, processing logic identifies, among stored text records, a stored text record that corresponds to the candidate text portion. The stored text records include additional text regions that previously had been determined to have satisfied at least one of the predetermined patterns.

At block 408, processing logic confirms whether the formatting type is appropriate for the candidate text portion bases on individual word matches between the candidate text portion and the stored text record.

At block 410, responsive to confirming that the formatting type is appropriate for the candidate text portion, processing logic notifies the user of the electronic document of the formatting suggestions according to the formatting type.

FIG. 5 is a flow diagram illustrating method 500 for confirming whether the formatting type is appropriate for the candidate text portion, in accordance with implementations of the disclosure. Method 500 may be performed by processing logic that includes hardware (e.g., circuitry, dedicated logic, programmable logic, microcode), software (e.g., instructions run on a processing device to perform hardware simulation), or a combination thereof. In some implementations, format suggestion module 118 executing at client device 110 may perform some or all the operations. In other implementations, format suggestion module 118 executing at sever(s) 112 may perform some or all the operations. In some implementations, format suggestion module 118 executing at client device 110 and server(s) 112 may perform some or all the operations. Elements of FIGS. 1, 2, and 3A-3C may be used to help illustrate method 500. It may be noted that the in some implementations, method 500 may include the same, different, fewer, or a greater number of operations performed in any order.

At block 502, processing logic performing method 500 identifies metadata associated with a word of the stored text record 322A that matches a corresponding word of the candidate text portion. In some implementations, processing logic attempts to match every word in candidate text portion with a word in stored text records 121.

For example as described above with respect to FIGS. 3A-3C, the text unit, "Marketing Plan" of the text region 315 is identified as the candidate text portion 320 of text region 315. The word, "marketing" is not found in the stored text records 121. The word, "plan" is identified in stored text record 322A. The word, "plan" of candidate text portion 320 matches the word "plan" of stored text record 322A. The metadata associated with the words (e.g., text 325) of stored text records 121 is formatting type 119 and count 330. In the current example, the count 330 associated with the word "plan" of stored text record 322A is 8, and the formatting type 119 associated with the word "plan" of stored text record 322A is heading level 1 formatting type.

At block 504, processing logic annotates the candidate text portion with the metadata. The candidate text portion 320 may be annotated with one or more of the metadata elements. In one example, the candidate text portion 320 may be annotated with the formatting type 119 identified in the stored text records 121 (e.g., [("marketing", no formatting type), ("plan", heading level 1 formatting type)]). In another example, the candidate text portion 320 may be annotated with the one or more of the formatting type 119 or count 330 (e.g., (e.g., [("marketing", no formatting type, count=0), ("plan", heading level 1 formatting type, count=8)]).

In some implementations, processing logic may determine whether to annotate the candidate text portion with the metadata. Processing logic may identify the count 330 associated with the word (e.g., "plan") of stored text record 322A. The count 330 may be indicative of the number of occurrences of the word in the stored text records 121 for a particular formatting type 119. Processing logic may determine whether the count 330 (e.g., count=8) associated with word (e.g., "plan") of the stored text record 322A satisfies a threshold number (e.g., count is greater than equal to 4). If the count associated with the word is greater than or equal to the threshold number, the count satisfies the threshold number and the candidate text portion 320 is annotated with the metadata. If the count associated with the word is less than the threshold number, the count does not satisfy the threshold number and the candidate text portion 320 is not annotated with the metadata. In some implementations, using count thresholding may help eliminate noise in the data of the annotated candidate text portion.

At block 506, processing logic provides to the trained machine learning model 160 first input that includes the annotated candidate text portion (e.g., [("marketing", no formatting type), ("plan", heading level 1 formatting type)]).

In some implementations, processing logic provides to the trained machine learning model 160 second input including the remaining text portion of the text region. In the example described above with respect to FIGS. 3A-3C, the text region 315 includes two lines of collaborative document

210, a first line with the words "Marketing Plan" followed by a carriage return, and a second line with a carriage return and no words. To include the remaining text portion as input to the trained machine learning model 160, processing logic may provide the following information ["marketing plan" followed by 2 carriage returns].

At block 508, processing logic obtains from the trained machine learning model 160 one or more outputs including a format identifier indicative of the formatting type and a level of confidence that the formatting type is appropriate for the candidate text portion. For example, the machine learning model may return the format identifier H1 indicative of a heading level 1 formatting type and a level of confidence of 95%.

In some implementations, confirming whether the formatting type is appropriate for the candidate text portion is based on the level of confidence that the formatting type is appropriate for the candidate text portion. In some implementations, processing logic may determine whether the level of confidence that the formatting type is appropriate for the candidate text portion satisfies a threshold level of confidence. Responsive to determining that the level of confidence satisfies the threshold level, processing logic confirms that the formatting type provided by the trained machine learning model 160 is appropriate for the candidate text portion.

For example, processing logic may compare the level of confidence (e.g., level of confidence of 95%) received as an output of the trained machine learning model 160 against the threshold level of confidence (e.g., level of confidence of 80%). If the level of confidence received as an output of the trained machine learning model 160 is greater than or equal to the threshold level of confidence, the level of confidence satisfies the threshold level of confidence and the formatting type (e.g., heading level 1 formatting type) indicated in the output of the trained machine learning model 160 is confirmed as appropriate for the candidate text portion.

In another example, if the level of confidence (e.g., level of confidence of 50%) received as an output of the trained machine learning model 160 is less than the threshold level of confidence (e.g., level of confidence of 80%), the level of confidence does not satisfy the threshold level of confidence and the formatting type (e.g., heading level 1 formatting type) is not confirmed as appropriate for the candidate text portion.

In implementations where the formatting type is not confirmed as appropriate for the candidate text portion, processing logic may not notify the user of the formatting suggestion according to the formatting type.

Figure 6:
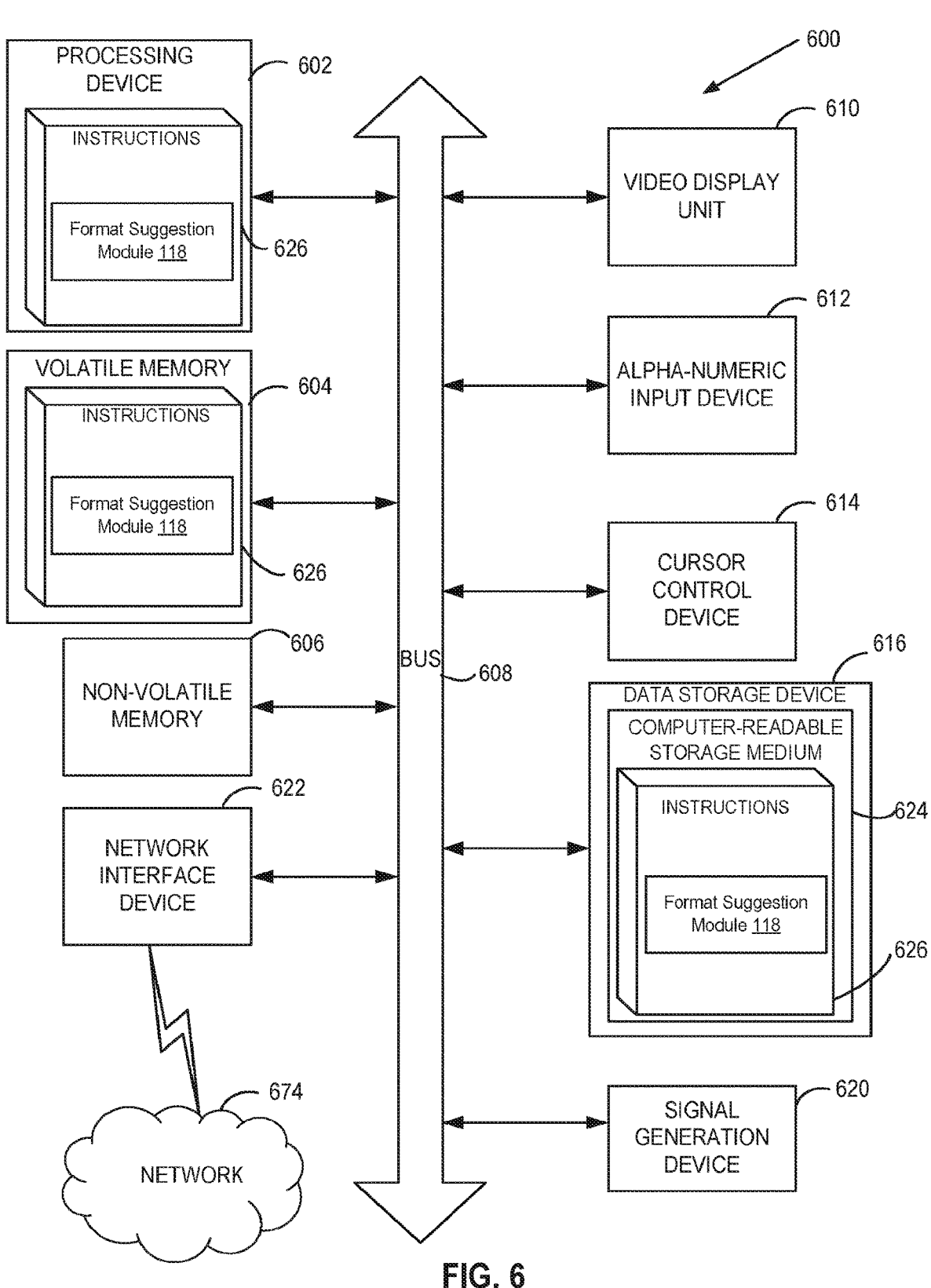
FIG. 6 depicts a block diagram of an example computing system operating in accordance with one or more aspects of the disclosure.

FIG. 6 depicts a block diagram of an example computing system operating in accordance with one or more aspects of the present disclosure. In various illustrative examples, computer system 600 may correspond to any of the computing devices within system architecture 100 of FIG. 1. In one implementation, the computer system 600 may be each of the servers 112A-112Z, the training engine 141, or training set generator 131. In another implementation, the computer system 600 may be each of the client devices 110A-110Z.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a computer-readable storage medium 624 (which may be a non-transitory computer-readable storage medium, although the disclosure is not limited to this) which may store instructions 626 encoding any one or more of the methods or functions described herein, including instructions implementing the format suggestion module 118 (118A-118Z), training set generator 131, or the training engine 141 of FIG. 1 for implementing any of the methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it can be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not necessarily intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure can, therefore, be determined with reference to the appended claims, along with the full scope of equivalents to which such claims are entitled.

What is claimed is:

1. A method for training a machine learning model comprising:
   generating training data for the machine learning model, wherein generating the training data comprises:
   generating first training input comprising candidate text portions of one or more electronic documents, wherein the candidate text portions correspond to user input to the one or more electronic documents; and
   generating a first target output for the first training input, wherein the first target output (a) identifies a suggested formatting type for each of the candidate text portions, wherein the suggested formatting type is different from an original formatting type of a respective candidate text portion, and (b) identifies an indication whether the suggested formatting type was accepted by a respective user; and
   providing the training data to train the machine learning model on (i) a set of training inputs comprising the first training input, and (ii) a set of target outputs comprising the first target output.

2. The method of claim 1, further comprising:
   generating second training input comprising contextual information associated with the candidate text portions, wherein the first target output is generated for the first training input and the second training input and identifies the suggested formatting type for each of the candidate text portions in accordance with respective contextual information, and
   wherein the set of training inputs comprises the second training input.

3. The method of claim 2, wherein the contextual information comprises text located before the candidate text portions in respective electronic documents of the one or more electronic documents.

4. The method of claim 3, wherein the contextual information comprises text located after the candidate text portions in the respective electronic documents of the one or more electronic documents.

5. The method of claim 1, wherein each training input of the set of training inputs is mapped to the first target output in the set of target outputs.

6. A method, comprising:
   receiving an indication of user input of a candidate text portion into an electronic document;
   subsequent to receiving the indication of user input of the candidate text portion into the electronic document, identifying metadata associated with a word of a stored text record that corresponds to a word of the candidate text portion, wherein the word of the candidate text portion is a candidate for applying a formatting suggestion that suggests a change to a format of at least part of the candidate text portion of the electronic document;
   annotating the candidate text portion with at least part of the metadata;
   providing, to a trained machine learning model, first input comprising the annotated candidate text portion that includes the candidate text portion annotated with the at least part of the metadata; and
   obtaining, from the trained machine learning model, one or more outputs identifying (i) a format identifier indicative of a suggested formatting type, and (ii) a level of confidence that the suggested formatting type is appropriate for the candidate text portion.

7. The method of claim 6, further comprising:
   determining whether the level of confidence that the suggested formatting type is appropriate for the candidate text portion satisfies a threshold level; and
   responsive to determining that the level of confidence that the suggested formatting type is appropriate for the candidate text portion satisfies the threshold level of confidence, generating a notification to a user of the electronic document of a formatting suggestion according to the suggested formatting type.

8. The method of claim 6, wherein the metadata indicates a heading level associated with the word of the stored text record.

9. The method of claim 6, wherein annotating the candidate text portion with the at least part of the metadata, comprises:
   identifying a count associated with the word of the stored text record, wherein the count is indicative of a number of occurrences of the word in a plurality of stored text records; and
   determining whether the count associated with the word of the stored text record satisfies a threshold number, wherein the candidate text portion is annotated with the at least part of the metadata associated with the word of the stored text record responsive to determining that the count satisfies the threshold number.

10. The method of claim 6, further comprising:
   providing, to the trained machine learning model, second input comprising a remaining text portion of the electronic document.

11. The method of claim 6, further comprising:
   identifying, among a plurality of stored text records, the stored text record that corresponds to the candidate text portion, wherein the plurality of stored text records comprises text regions that previously had been determined to satisfy have satisfied at least one of a plurality of predetermined patterns and comprises words of additional candidate text portions for which respective formatting suggestions were accepted by a user associated with the electronic document.

12. The method of claim 11, wherein the plurality of stored text records comprises text of one or more electronic documents edited by the user.

13. A system, comprising:
a memory; and
a processing device, coupled to the memory, to perform operations comprising:
generating training data for a machine learning model, wherein generating the training data comprises:
generating first training input comprising candidate text portions of one or more electronic documents, wherein the candidate text portions correspond to user input to the one or more electronic documents; and
generating a first target output for the first training input, wherein the first target output (a) identifies a suggested formatting type for each of the candidate text portions, wherein the suggested formatting type is different from an original formatting type of a respective candidate text portion, and (b) identifies an indication whether the suggested formatting type was accepted by a respective user; and
providing the training data to train the machine learning model on (i) a set of training inputs comprising the first training input, and (ii) a set of target outputs comprising the first target output.

14. The system of claim 13, the operations further comprising:
generating second training input comprising contextual information associated with the candidate text portions, wherein the first target output is generated for the first training input and the second training input and identifies the suggested formatting type for each of the candidate text portions in accordance with respective contextual information, and
wherein the set of training inputs comprises the second training input.

15. The system of claim 14, wherein the contextual information comprises text located before the candidate text portions in respective electronic documents of the one or more electronic documents.

16. The system of claim 15, wherein the contextual information comprises text located after the candidate text portions in the respective electronic documents of the one or more electronic documents.

17. The system of claim 13, wherein each training input of the set of training inputs is mapped to the first target output in the set of target outputs.

18. A system, comprising:
a memory; and a processing device, coupled to the memory, to perform operations comprising:
receiving an indication of user input of a candidate text portion into an electronic document;
subsequent to receiving the indication of user input of the candidate text portion into the electronic document, identifying metadata associated with a word of a stored text record that corresponds to a word of the candidate text portion, wherein the word of the candidate text portion is a candidate for applying a formatting suggestion that suggests a change to a format of at least part of the candidate text portion of the electronic document;
annotating the candidate text portion with at least part of the metadata;
providing, to a trained machine learning model, first input comprising the annotated candidate text portion that includes the candidate text portion annotated with the at least part of the metadata; and
obtaining, from the trained machine learning model, one or more outputs identifying (i) a format identifier indicative of a suggested formatting type, and (ii) a level of confidence that the suggested formatting type is appropriate for the candidate text portion.

19. The system of claim 18, the operations further comprising:
determining whether the level of confidence that the suggested formatting type is appropriate for the candidate text portion satisfies a threshold level; and
responsive to determining that the level of confidence that the suggested formatting type is appropriate for the candidate text portion satisfies the threshold level of confidence, generating a notification to a user of the electronic document of a formatting suggestion according to the suggested formatting type.

20. The system of claim 18, wherein annotating the candidate text portion with the at least part of the metadata, comprises:
identifying a count associated with the word of the stored text record, wherein the count is indicative of a number of occurrences of the word in a plurality of stored text records; and
determining whether the count associated with the word of the stored text record satisfies a threshold number, wherein the candidate text portion is annotated with the at least part of the metadata associated with the word of the stored text record responsive to determining that the count satisfies the threshold number.

* * * * *